United States Patent [19]

Chu et al.

[11] Patent Number: 6,006,331

[45] Date of Patent: Dec. 21, 1999

[54] RECOVERY OF ONLINE SESSIONS FOR DYNAMIC DIRECTORY SERVICES

[75] Inventors: Lon-Chan Chu, Bellevue; Yoram Yaacovi, Redmond; Kent F. Settle, Kirkland, all of Wash.

[73] Assignee: Microsoft Corporation, Redmond, Wash.

[21] Appl. No.: 08/902,082

[22] Filed: Jul. 29, 1997

[51] Int. Cl.$^6$ .............................. G06F 11/00; G06F 13/00
[52] U.S. Cl. .............................. 713/201; 709/227; 714/4; 707/202
[58] Field of Search ......................... 395/200.57, 182.02, 395/187.01; 707/202; 709/227; 714/4; 713/201

[56] References Cited

U.S. PATENT DOCUMENTS 5,802,518   6/1996   Karaev et al. .............................. 707/9
5,884,024   3/1999   Lim et al. ................................ 713/201

OTHER PUBLICATIONS

IBM Technical Disclosure Bulletin, vol. 27, NR 11, pp. 6754–6756, Apr. 1, 1985.

"Entry–Level StandbyServer™", http://www.vinca.com/products/sbsnw/eldata.html Vinca Corporation, pp. 1–3 (1996).

"OS/2 Warp Server beta testing to begin in late Aug.", http://www.austin.ibm.com/pspinfo/wsbeta.html, IBM Corporation, pp. 1–4 (1995).

"StandbyServer 32 with Autoswitch", http://www.eiknes.fi/mikronet/v_nw32.ssi Mikronetm pp. 1–3 (May 23, 1996).

Howes, T., et al., "The LDAP Application Program Interface", Request for Comments: 1823; University of Michigan, pp. 1–30 (Aug. 1995).

Williams, R., et al., "User Location Service (ULS)", Internet Draft "draft–uls–1.txt", Microsoft Corporation, pp. 1–9 (Feb. 1996).

Yaacovi, Y., et al., "Lightweight Directory Access Protocol (v3); Extensions for Dynamic Directory Services", Internet Draft "draft–ietf–asid–ldapv3ext–04.txt", pp. 1–8 (May 1, 1997).

Yeong, W., et al., "Lightweight Directory Access Protocol (LDAP V2)", Request for Comments (RFC) 1777, University of Michigan, ISODE Consortium, pp. 1–10, 12–30 (Mar. 1995).

Primary Examiner—Robert W. Beausoliel, Jr.
Assistant Examiner—Brian H. Shaw
Attorney, Agent, or Firm—Shwegman, Lundberg, Woessner & Kluth, P.A.

[57] ABSTRACT

The recovery of online sessions for directory services is disclosed. A server maintains a directory service of a plurality of clients. In one embodiment, a unique token for each client, known to the client and to the server, permits the client to relog onto the server, for example, after the client has crashed. In another embodiment, a client caches the information sent to the server during the log-on process, so that if the server in response to a later refresh request from the client cannot locate the client—as a result, for example, of a network or server crash—the client can automatically relog onto the server using the cached information, without user intervention. The message sent by the server to the client in response to a refresh request, after the client's entry in the directory no longer exists after a server or network crash, is desirably a dedicated error message instructing the client that it is not logged onto the server, and therefore that it should relog onto the server.

20 Claims, 13 Drawing Sheets

RECOVERY OF ONLINE SESSIONS FOR DYNAMIC DIRECTORY SERVICES

FIELD OF THE INVENTION

This invention relates generally to dynamic directory services, and more particularly to the recovery of online sessions for such services.

BACKGROUND OF THE INVENTION

Current trends in computing suggest that computers are becoming networked to one another on a greater and greater scale. For example, computers that previously were connected to other computers in the same building over a local-area network (LAN) are now commonly connected to other computers all over the world over a wide-area network (WAN), an intranet, or the Internet. The rising prominence of the Internet in fact presages a future where all computers are able to connect with one another over a single vast global network.

With this rise in connectivity comes the need for easier recovery from the effects of client, server, and network crashes on directory services for such networks. One type of directory is similar to a phone book. The phone book permits a person to look up the phone number of another person so that the first person can communicate with the second person. Similarly, this type of directory for a computer network permits a computer user to look up the electronic address of another computer user (for example, the user's current dynamic Internet Protocol (IP) address in the case of a typical home Internet user), so that the first user can communicate with the second user. Although directory services may be used for a wide variety of different applications other than just to locate a user by looking up his or her electronic address, such user-location applications are nevertheless very common. For example, being able to determine the current IP address of a computer user is a very important feature for such diverse Internet applications as Internet telephony, whiteboarding, and videoconferencing.

However, unlike the phone book, which is a static directory, the directory for a computer network such as the Internet frequently must be dynamic in order to be useful. The phone book is a static directory in that it is not updated very often, typically only once a year when a new book is published. The phone book remains accurate, however, because each person's phone number generally also does not change very often. Conversely, in the case of the Internet, while every user may have a static electronic mail address (that is, an e-mail address that does not change often), every user typically does not have a static IP address. Dial-up users in particular are assigned a dynamic IP address by their Internet Service Provider (ISP) each time they initiate an online session. This lessens the accuracy and usefulness of a static directory for many Internet applications.

Static directory services nevertheless do exist for the Internet, and other Internet-like networks. One such static directory service is provided by the Lightweight Directory Access Protocol (LDAP). The LDAP is known within the art, and is specifically described in W. Yeong, et al., Request for Comments (RFC) 1777, March 1995, which is hereby incorporated by reference. The LDAP permits a server to maintain a static directory. Clients capable of communicating with the server are able to add entries to the directory by sending the server the appropriate request. These entries are static in that they persist until the client establishing them requests their removal from the server. If clients forget to make such requests, the server may maintain their entries in the directory indefinitely, which in time may result in the directory including outdated information. For example, if the server is maintaining a user-location directory of IP addresses, an entry containing the dynamic IP address of a client who has since logged off the Internet is inaccurate.

Dynamic directory services differ from static directory services in that entries must be periodically refreshed by their clients, or otherwise they automatically are removed by the server. Dynamic directory services also exist for the Internet, and other Internet-like networks. One such dynamic directory service is provided by the User Location Service (ULS). The ULS is known within the art, and is specifically described in R. Williams, Internet Draft "draft-uls-1.txt", February 1996, which is hereby incorporated by reference. A server maintaining a dynamic directory as provided by the ULS is receptive to requests from clients to add entries to the directory that include a time-to-live value set by the client. If the client does not refresh its entry before the time-to-live value times out, the server is permitted to delete the entry. Thus, if the server is maintaining a user-location directory of IP addresses, an entry containing the dynamic IP address of a client who has since logged off will eventually be deleted by the server.

The time-to-live value is related to a period called the client refresh period. The client refresh period is how often the client refreshes its entry with the server. Ideally, the client refresh period could be set to the time-to-live value, since the client need only refresh its entry with the server before the time-to-live value times out in order to maintain the entry in the directory. However, because refresh requests may become lost, or even because of delays in transmitting the message to the server or delays in processing the message at the server, for practical reasons the client refresh period is usually set to a time period less than the time-to-live value. For example, a client refresh period of five minutes and a time-to-live value of ten minutes ensures that a client's entry will not be deleted by the server even if every other refresh request sent by the client does not get through to the server.

Another dynamic directory service is an extension to the LDAP as described in the U.S. patent application entitled 'Server-Determined Client Refresh Periods for Dynamic Directory Services,' filed on Jul. 2, 1997, Ser. No. 08/886,796, which is hereby incorporated by reference. The dynamic directory service provided by this reference extends the capability of an LDAP directory to include dynamic entries. Thus, when a client sends a request to a server to create an entry for an LDAP directory maintained by the server, the client is able to specify whether the entry to be created is dynamic or static. If the entry is dynamic, the client must immediately send a refresh request to the server, in response to which the client will receive a response including a client-refresh period. If the client does not send another refresh request prior to the timing out of this period, the entry will eventually be deleted by the server.

Dynamic directories are useful in that they permit the servers maintaining them to periodically perform a garbage collection operation in a manner which does not affect the directories' accuracy. An entry in a dynamic directory is dynamic in that it lives for only a given period of time unless refreshed by its client. The server thus only deletes expired entries. By comparison, servers maintaining static directories perform garbage collections indiscriminately, because they do not know which entries have expired. The servers may delete only very old entries, which probably are outdated, but this means the entries will have persisted long enough to have rendered the directories inaccurate for a period of time. Alternatively, the servers may delete relatively younger entries, in which case the accuracy of the directory is maintained but some accurate entries will likely have been deleted.

Dynamic directories have their own flaws, however. A problem with dynamic directories is a clients's ability to recover from the client crashing, or automatically recover when the server or the network linking the client to the server crashes. For example, once a client has established an entry with a server maintaining a dynamic directory, the client may have difficulty reestablishing the entry upon rebooting after a crash. When attempting to reestablish the same entry with the server (for example, relog onto the server), the server may not permit the client to reestablish the entry, since the entry previously established by the client may still persist on the dynamic directory. The client may have no choice other than to wait a complete client-refresh period, and then hope the server deletes the entry promptly after the entry has expired. This is because typically the server does not permit duplicate entries from the same client, even though the server may allow different entries from the same client.

The client may also have difficulty recovering even when it is not at fault, such as when the network linking the client to the server crashes, or when the server itself crashes. For example, when the network crashes, the server may not receive requests sent by the client to refresh its entry in the dynamic directory maintained by the server. If the crash persists long enough, the entry may time out, and be deleted by the server. When the network finally comes back up, the server may receive another refresh request from the client, but not be able to locate the entry to which the refresh request pertains in the dynamic directory. The server thus responds to the client by sending a 'no such object' or other error message, which typically requires user intervention at the client in order to reestablish the entry with the server (for example, relog onto the server).

As another example, when the server itself crashes and is forced to reboot (reset), it typically will begin with a new dynamic directory, void of any entries. The dynamic directory, because of the frequency at which it typically is updated, is usually stored in volatile memory, such as random-access memory, instead of being stored on a more permanent storage device, such as a hard disk drive. Thus, the dynamic directory is lost when the server crashes and must be reset. Even if the dynamic directory is periodically backed up to a storage device such as a hard disk drive, the directory may not be completely up-to-date, and the entry established by the client may not reside within the backed-up version of the directory. Therefore, when the server receives a refresh request from the client after rebooting, it may not be able locate the entry to which the request pertains in the dynamic directory. The server again responds to the client by sending an error message to the client, which results in user intervention at the client in order to handle the message and reestablish the entry with the server.

There is a need, therefore, to solve these recovery problems. Such a solution should permit a client to reestablish its entry with a server after the client has crashed, without having to wait for the server to delete the entry after it has timed out. The solution should also permit the client to recover, without user intervention at the client, from a server or network crash that results in a dynamic directory maintained by the server not containing the entry for the client.

SUMMARY OF THE INVENTION

The above-mentioned shortcomings, disadvantages and problems are addressed by the present invention, which will be understood by reading and studying the following specification. To solve the recovery problem when a client crashes, one aspect of the invention calls for a unique token for each client. The server is aware of each token, and each token may itself be created by either the server, or the client for the token. When a client crashes after having already logged onto the server, it is able to relog back onto the server by using its token. The server permits the client to immediately relog onto the server, without the client having to wait for its entry in the dynamic directory maintained by the server to time out and be deleted by the server. For example, the server permits the client to take over its former entry in the directory upon matching the token submitted by the client when relogging onto the server with the token for that client already known by the server.

To solve the recovery problem when the server crashes, or when the network linking each client to the server crashes, another aspect of the invention calls for each client to cache all the information sent from the client to the server when first logging onto the server. When either the server or the network crashes, such that the dynamic directory maintained by the server no longer contains an entry for the client, the client is able to use the cached information to automatically relog back onto the server without user intervention. For example, the client may send a refresh request to the server, not knowing that its entry in the dynamic directory is no longer there. In response to receiving an error message from the server (that is, a message notifying the client to log back onto the server), the client resends the information cached from its first log-on to relog onto the server. The client can do this automatically, without having to ask the user at the client to reinput the information it had previously entered during the first logon.

The present invention describes systems, clients, servers, methods, and computer-readable media of varying scope. The two aspects of the invention described in this summary may be utilized separately, or together. In addition to the aspects and advantages of the present invention described here, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into six sections. In the first section, the hardware and the operating environment in conjunction with which embodiments of the invention may be practiced are described. In the second section, a system level overview of the invention is presented. In the third section, methods for an exemplary User Location Service (ULS) embodiment of the invention are provided. In the fourth section, methods for an exemplary Internet Locator Service (ILS) embodiment of the invention is given. In the fifth section, methods for an exemplary embodiment of the invention capable of implementation on either ULS or ILS are described. Finally, in the sixth section, a conclusion of the detailed description is provided.

Hardware and Operating Environment

Figure 1:
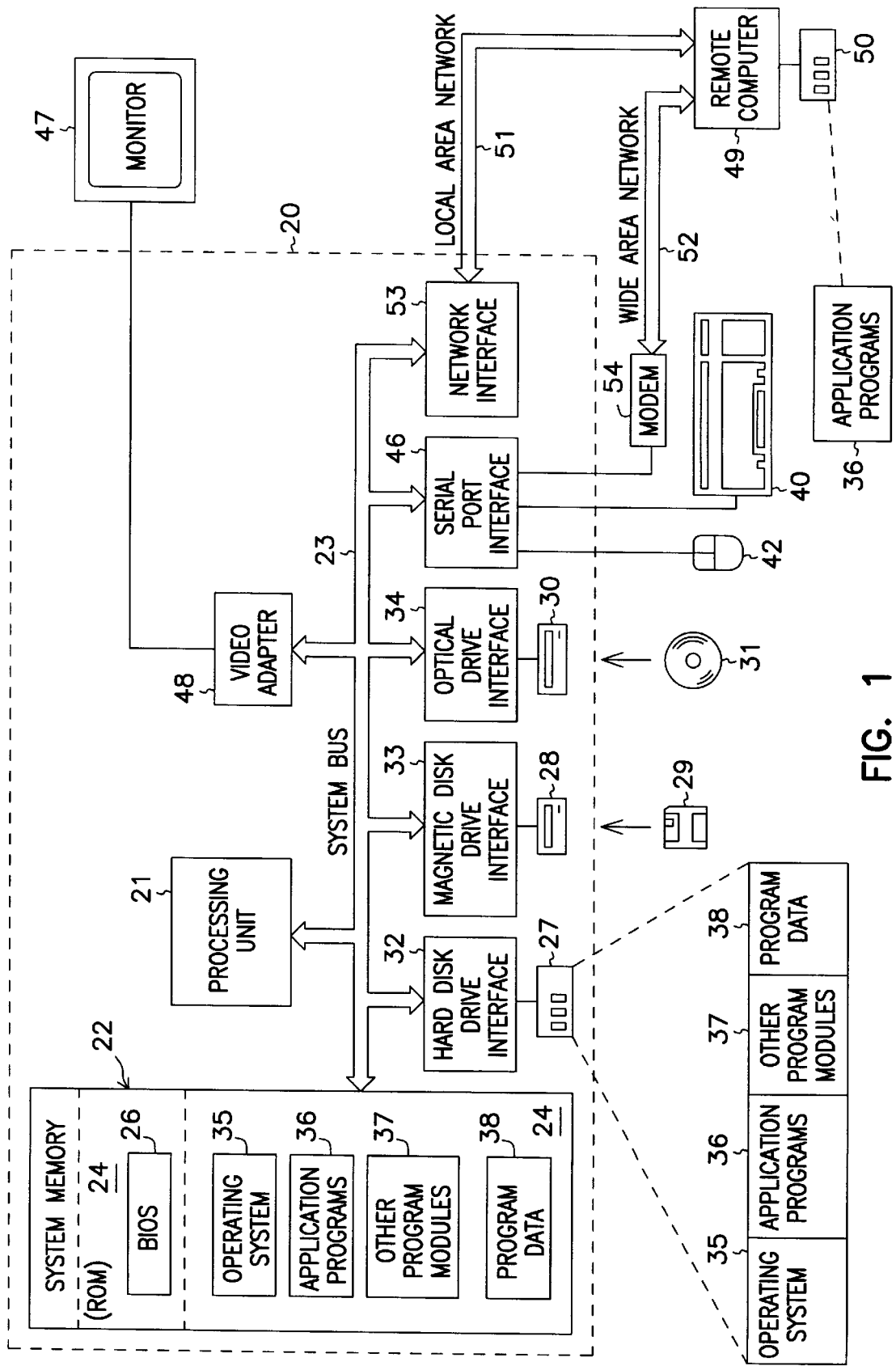
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIGS. 2(a)–2(d) in the case of recovery when a client crashes, FIGS. 3(a)–3(e) in the case of recovery when a server crashes, and FIGS. 4(a)–4(e) in the case of recovery when a network crashes. One embodiment of the invention relates to the case where a client crashes, and another embodiment of the invention relates to the case where either a server or a network crashes. These embodiments may also be used together in a third embodiment.

Those of ordinary skill in the art will recognize that the term "crashing" is used very broadly for the purposes of this patent application. For example, the term "client crashing" encompasses every situation where the client cannot perform its expected duties on time or otherwise does not perform them as expected in relation to a directory service maintained by a server. Similarly, the term "server crashing" encompasses every situation where the server does not perform its expected duties on time or otherwise does not perform them as expected in relation to the directory service, while the term "network crashing" encompasses every situation where the network does not perform its expected duties on time or otherwise does not perform them as expected in relation to the directory service. Thus, a user turning off his or her client computer without logging off, a cable within a network being disconnected and which causes a client not being able to communicate with a server, and a server inexplicably losing its client database for any reason whatsoever, all fall under the term "crashing" as the term is used in this patent application.

Figure 2A:
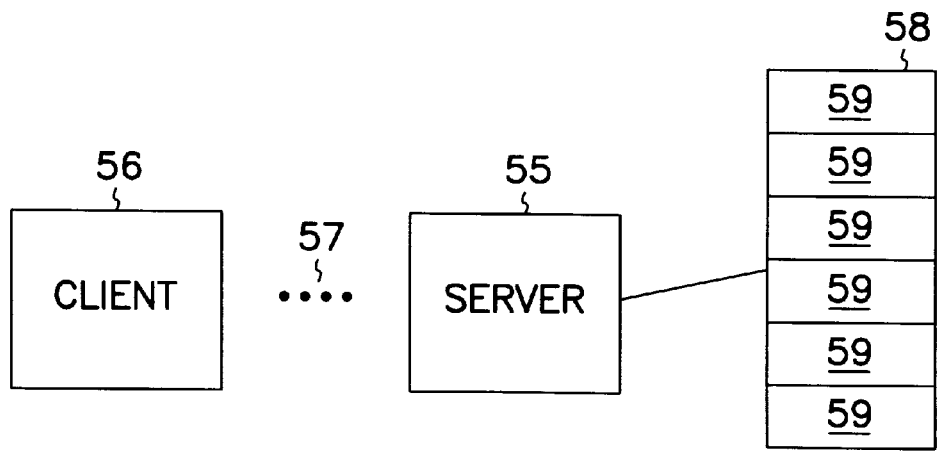
FIGS. 2(a), 2(b), 2(c), and 2(d) show diagrams illustrating a system-level overview of an exemplary embodiment of the invention in the case where a client has crashed.

Referring first to FIG. 2(a), the case of recovery when a client crashes is first described. Server 55 may be communicatively coupled with client 56 over a network. Server 55 is a computer, such as the computer 20 of FIG. 1 as has been described. Server 55 has a communications device (not shown) so that it may communicate with client 56 over the network. Server 55 also has a computer-readable media, such as a memory, to store data and computer programs, and a processor to execute the programs from the media. Client 56 is also a computer, such as the computer 20 of FIG. 1, and also has a communications device (not shown) so that it may communicate with server 55 over the network. Client 56 also has a computer-readable media, such as a memory, to store data and computer programs, and a processor to execute the programs from the media. Finally, client 56 desirably has a non-volatile storage device, such as a hard disk drive.

As shown in FIG. 2(a), client 56 is logging onto server 55 to initiate an online session with server 55. This is represented by series of dots 57. Initiation of an online session is accomplished by a client sending a message to the server requesting that the client be permitted to log onto the server. The message includes information regarding client 56, such as the client's IP address and desirably user information regarding the user at the client. For example, this user information may include the user's name, and city and state of residence. The invention is not limited to the type of information sent by the client when logging onto the server.

Server 55 is maintaining dynamic directory 58, which contains a number of slots 59. The invention is not specific to a particular data format for the dynamic directory maintained by the server. For example, a dynamic directory service maintained as a User Location Service (ULS) or as a Internet Locator Service (ILS), as are described in following sections of this detailed description, may utilize the directory data formats already specified by the ULS or ILS, such as a complex tree data structure understood by those skilled in the art. For sake of clarity, however, dynamic directory 58 is diagrammatically shown in FIG. 2(a) as a simplified data format of a directory structure. Each slot 59 may hold an entry of the dynamic directory service (for example, corresponding to a particular client that has logged onto the server maintaining the dynamic directory service).

Figure 2B:
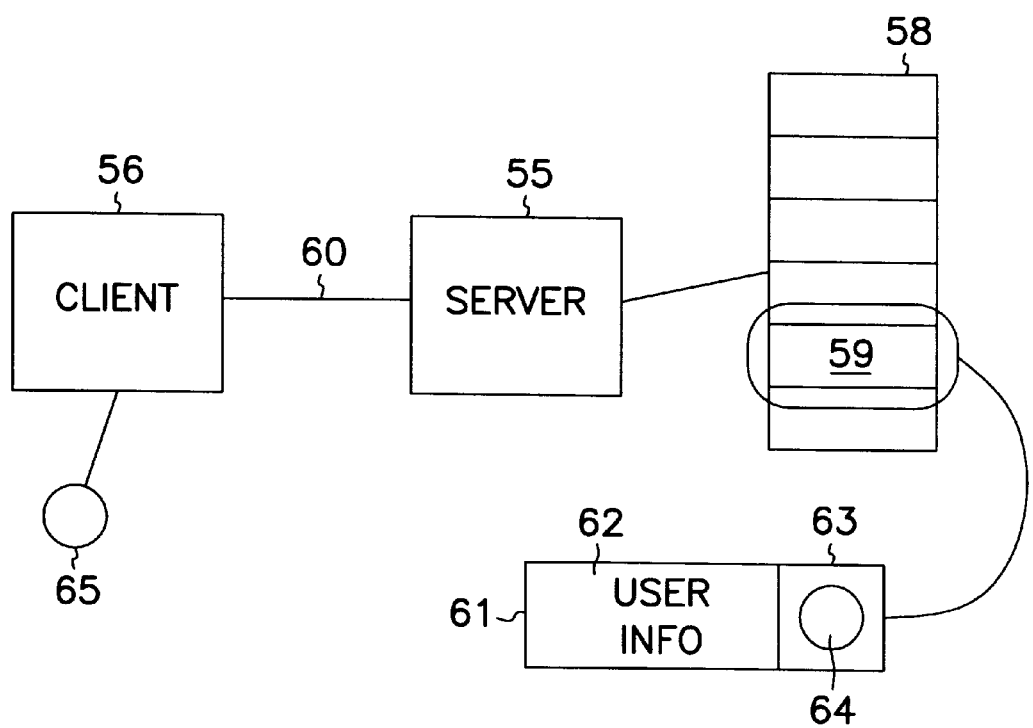
Figure 2C:
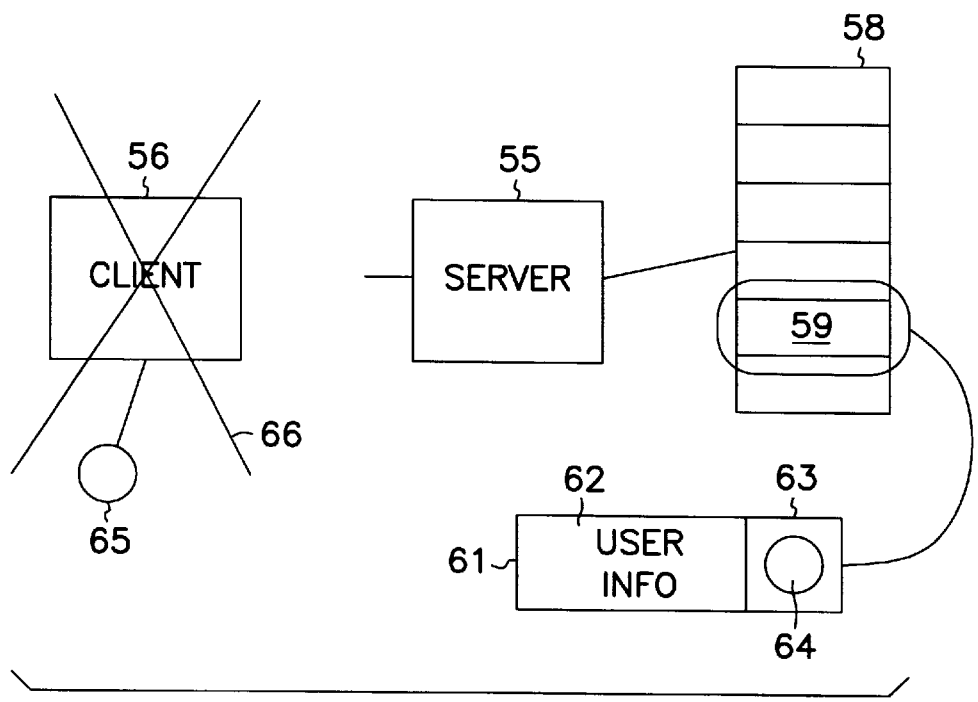

Referring next to FIG. 2(b), client 56 is shown as having successfully logged onto server 55, as represented by solid line 60. Server 55 has filled one of the slots 59 of directory 58 with entry 61 specific to client 56. Entry 61 includes at least field 62 containing user information regarding client 56, and also field 63 including token 64. In one embodiment, token 64 is created by server 55 and sent in a message from the server 55 to client 56 in response to the message from client 56 requesting that it be permitted to log onto the server. Thus, client 56 has token 65, which is identical to token 64. In another embodiment, token 64 is still created by server 55, but is not sent to client 56 until client 56 sends a refresh message, in response to which server 55 sends client 56 a message including token 64. Finally, in another embodiment, client 56 creates token 65 first, and sends token 65 to server 55 while logging on (i.e., as represented by dotted line 57 of FIG. 2(a)), which then creates token 64 as identical to token 65.

Token 65 and token 64 as shown in FIG. 2(b) are thus identical to one another. The tokens are also unique to client 56. If an entry is created for another client, the resulting tokens instantiated will be unique to that client as well. This permits the server to uniquely identify the client that has created a particular entry in the dynamic directory maintained by the server. This is useful, for example, when the client crashes, and must relog onto the server. In one such embodiment, the token is the current machine time on the server, which will be unique in practical operation. In another embodiment, the token is a globally unique identifier (GUID), as also known within the art. The term "unique tokens," for purposes of this patent application includes tokens that are substantially unique from one another across a given server. Thus, an almost unique token is acceptable if the possibility of duplicate combination of token and user identification is extremely low. One such embodiment is a four-byte counter on the server, as known within the art.

Client 56 stores token 65 in a non-volatile storage device, such as a hard disk drive. Therefore, when it reboots after crashing, client 56 is able to retrieve token 65, and signal to server 55 that it is the rightful owner of entry 61 that was previously created for client 56 in dynamic directory 58. Thus, referring to FIG. 2(c), client 56 has crashed, as represented by crossed lines 66. However, even though client 56 has crashed, server 55 still maintains entry 61 in slot 59, the entry including the user information in field 62, and token 64 in field 63. Because directory 58 is dynamic, server 55 may eventually delete entry 61, because the entry persists only so long as it is refreshed at least once during every client-refresh period (CRP), as known by those of ordinary skill within the art. However, in the case where the CRP is sufficiently long—for example, at least a number of minutes in duration—client 56 will have enough time to reboot (reset) and attempt to relog onto server 55.

Figure 2D:
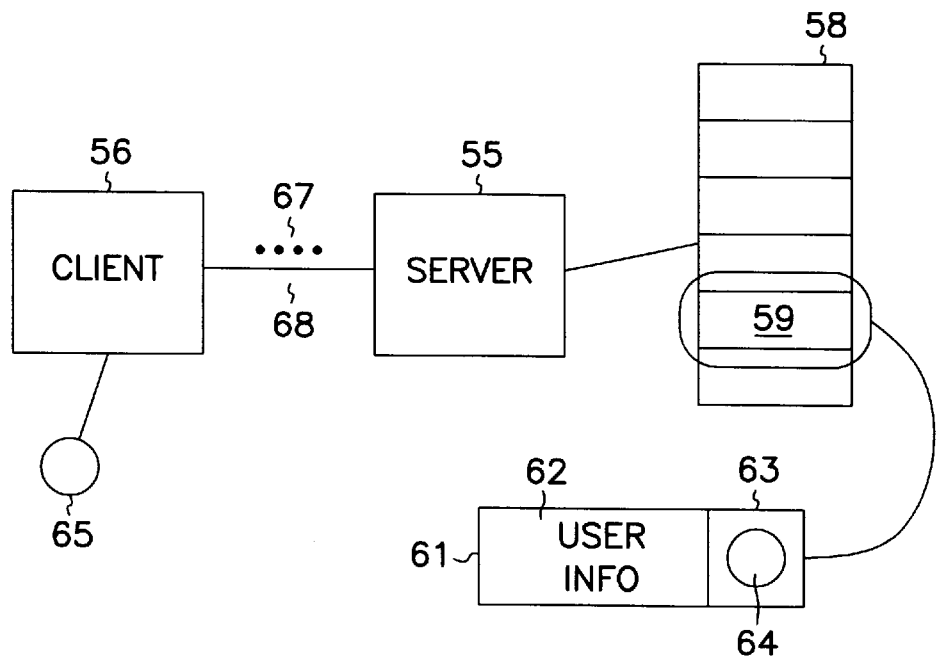

Referring to FIG. 2(d), client 56 has rebooted and has retrieved token 65 from a non-volatile storage device such as a hard disk drive. Client 56 is attempting to relog onto server 55 by sending a message to server 55 requesting that the client be permitted to log onto the server. This message includes the same user information as previously sent (i.e., as stored by the server as field 62 of entry 61), as well as token 65. Before creating a new entry within directory 58 for client 56, server 55 first determines whether another entry already has the same user unique identifier. Server 55 desirably does not allow two entries to exist that have the same user information.

Server 55 thus will find entry 61 as containing the same user information as submitted by client 56. Ordinarily, server 55 would not allow client 56 to log onto the server. However, server 55 further checks the token submitted by client 56 (token 65) against the token stored in the entry containing the identical user information (token 64). Finding a match, server 55 permits client 56 to log onto the server, taking over entry 61, as represented by solid line 68.

The inventive unique token thus permits a client to relog onto a server after the client has crashed and is forced to reboot or reset, while preventing the creation of different entries in the dynamic directory maintained by the server having identical fields of user information. When the server receives a message from a client requesting that the client be permitted to log onto the server, the server will not permit the client to log on with the same user information as that for another entry in the directory unless the token submitted by the client matches the token stored in that entry. When the tokens match, the server knows that this means that the client for whom the entry had been initially created had to reset, and is now requesting to relog onto the server. The client does not, for example, have to wait for the entry to time out and be deleted by the server.

The unique token also adds security to the dynamic directory. For example, while a first client having a user named 'John Doe' and hailing from 'Redmond, Wash.' has a corresponding entry in the dynamic directory maintained by the server, the client cannot be mimicked by an imposter client requesting that the server create an entry with an identical user name and location. The imposter client does not have access to the client's unique token, known to both the first client and the server. Therefore, the server will not allow the imposter client to take over the first client's entry.

Those of ordinary skill within the art will appreciate that a client may request that the server create more than one entry for it in the dynamic directory. In this situation, what has been described as the client logging onto the server will be recognized as also meaning the client requesting that the server create another entry for it in the dynamic directory. In addition, those of ordinary skill will appreciate that a client may request that the server create one or more dynamic attributes for an otherwise static entry in a directory. In this latter situation, for example, each dynamic attribute may have its own token, or there may be only one token for all the dynamic attributes created by a client for a given entry. The invention is not so particularly limited in this regard. The terminology used in this patent application with respect to a client logging onto a server is also meant to include both of these cases. In this situation as well, what has been described as the client logging onto the server will be recognized as also meaning the client requesting that the server create one or more dynamic attributes in a new static entry for it in the directory.

Figure 3A:
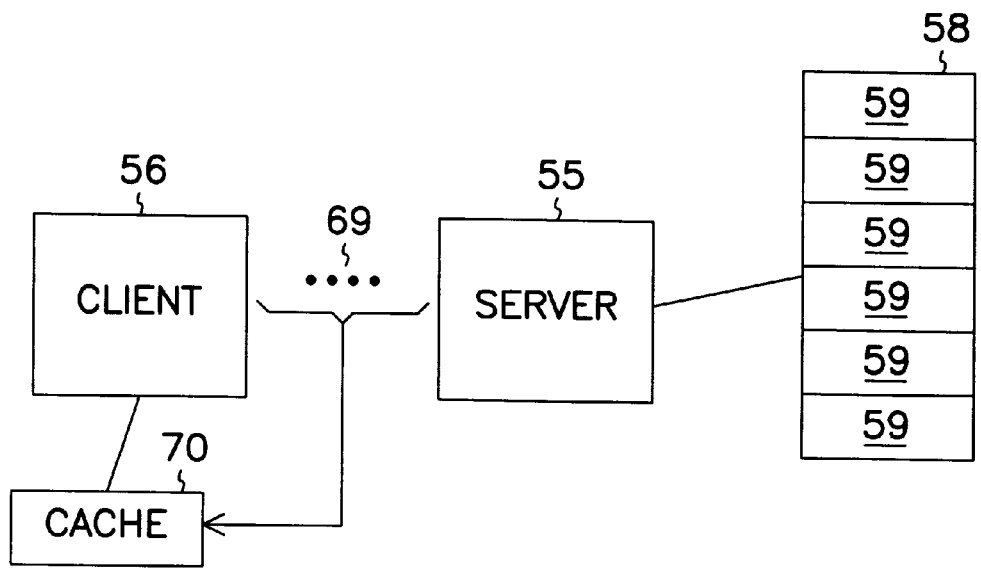
FIGS. 3(a), 3(b), 3(c), 3(d), and 3(e) show diagrams illustrating a system-level overview of an exemplary embodiment of the invention in the case where a server has crashed.

Referring now to FIG. 3(a), the case of recovery when a server has crashed is described. Client 56 is logging onto server 55 maintaining dynamic directory 58 having slots 59, to initiate an online session with server 55 as has been described. This is represented by series of dots 69. Initiation of an online session is accomplished by a client sending a message to the server requesting that the client be permitted to log onto the server. The message includes information regarding client 56, such as the client's IP address and desirably user information regarding the user at the client. The information sent by client 56 during log-on with server 55 is saved by client 56 in cache 70.

Figure 3B:
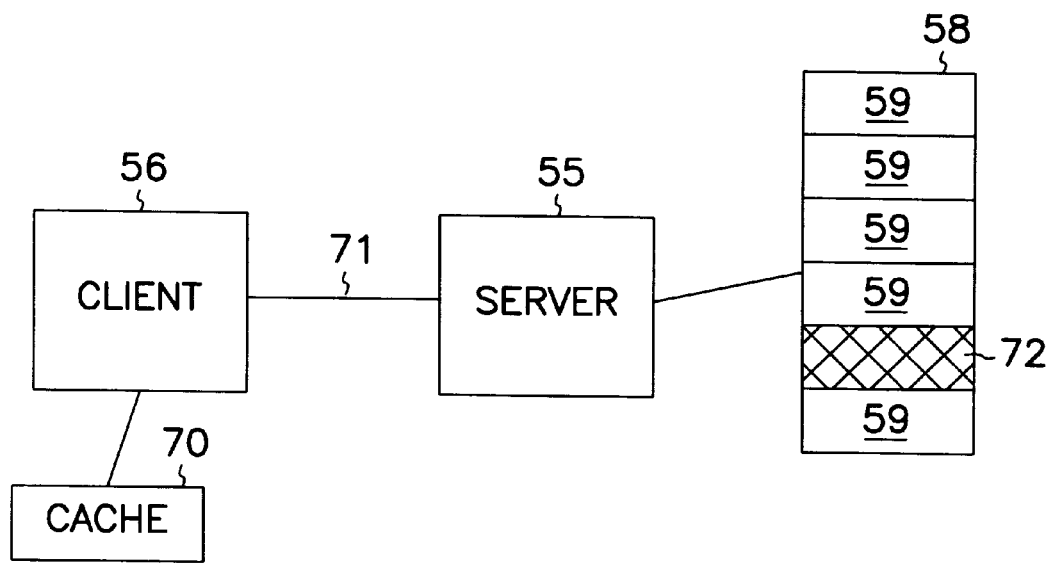

Referring next to FIG. 3(b), client 56 is shown as having successfully logged onto server 55, as represented by solid line 7 1. Server 55 has filled one of the slots 59 of directory 58 with entry 72 specific to client 56. Note that cache 70 also saves all the changes made to user information on the server, where the user at the client makes the changes. In this embodiment of the invention, the information contained in an entry for a client is not particularly limited, but desirably includes the user information conveyed by the client when logging on. The entry may also include a token, as has been described in conjunction with FIGS. 2(a)–2(d), but the invention is not so limited. In other words, the embodiment of the invention described in conjunction with FIGS. 2(a)–2(d), which relates to recovery when a client has crashed, may be implemented together with the embodiment which relates to recovery when a server has crashed, but the invention is not so limited. The embodiment of the invention relating to recovery when a server has crashed may be implemented independent of the embodiment relating to recovery when a client has crashed.

Figure 3C:
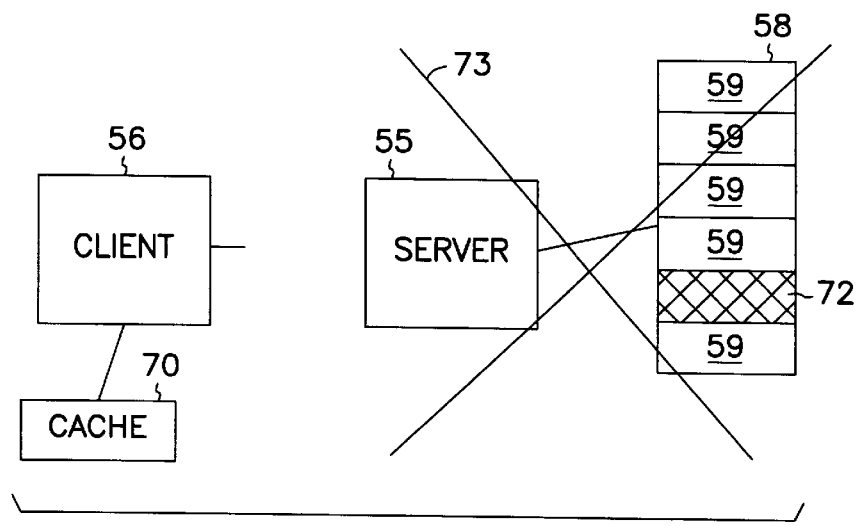

Thus, referring to FIG. 3(c), server 55 has crashed, as represented by crossed lines 73. Client 56 still maintains cache 70. However, the crashing of server 55 means that the server must be rebooted or reset. Such rebooting or resetting usually causes dynamic directory 58 to become erased, such that it no longer contains the previously created entry 72. This is because the dynamic directory is desirably stored in volatile memory of the server, such as random-access memory (RAM), to ensure that the server can quickly respond to messages received from clients that relate to the directory. Storing the directory in a non-volatile storage device such as a hard disk drive does not permit such quick responses. Moreover, even if server 55 occasionally backs up the directory to a non-volatile storage device, entry 72 may have been created after the most recent back up, so that it is in any case not retrievable upon rebooting or resetting of server 55.

Figure 3D:
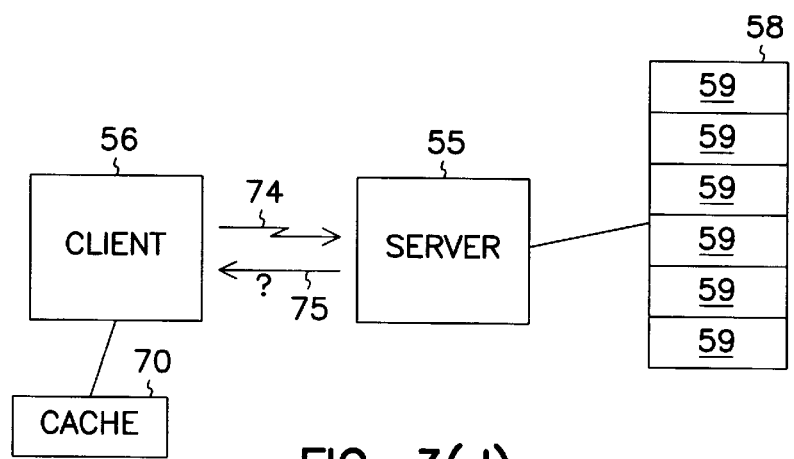

Referring to FIG. 3(d), server 55 has rebooted, resulting in a new dynamic directory 58 having slots 59, none of which contain the previously created entry 72. Client 56, however, is not aware that server 55 has crashed and rebooted. Therefore, client 56 will continue to attempt to refresh its entry within the dynamic directory maintained by the server, to prevent the entry from timing out and be deleted by the server. Thus, client 56 will send a message to server 55 to request that its entry within directory 58 be refreshed. This message is represented by jagged arrow 74. Once server 55 has rebooted, however, it will not be able to find the entry to which the refresh request pertains, and therefore will send back to client 56 in response an error message. This message is represented by arrow 75. Client 56 will receive this message as a message instructing it to relog onto server 55, because for a reason not known to client 56, its entry within directory 58 is no longer there.

Figure 3E:
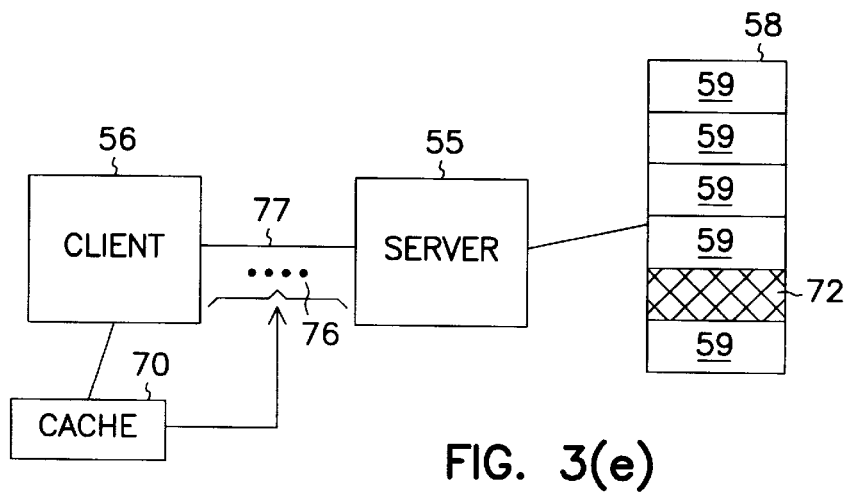

Referring to FIG. 3(e), client 56 uses the information previously stored in cache 70 to automatically relog onto server 55 without user intervention. Client 56 sends a message to the server 55 requesting that it be permitted to log onto the server. This message is represented by series of dots 76. The information contained in this message is obtained from cache 70, which contains accurate user information for this client before the server crashes. Server 55 permits client 56 to log onto the server, as represented by solid line 77, and recreates entry 72 within dynamic directory 58, in accordance with the information conveyed by client 56 a second time.

The inventive caching of the information used by a client to first log onto a server thus later permits the client to subsequently relog onto the server should the need arise, automatically and without user intervention. For example, when a client first logs onto the server, the client may have to query the user for specific information, such as the user's name and location. By caching this information, when the client later relogs onto the server, the client does not have to requery the user. More importantly, the relogging process is seamless, and the user may not even need to be told that the client has relogged onto the server.

As with the embodiment of the invention relating to recovery when a client has crashed, in this embodiment as well, those of ordinary skill within the art will appreciate that a client may request that the server create more than one entry for it in the dynamic directory. In this situation, what has been described as the client logging onto the server will be recognized as also meaning the client requesting that the server create another entry for it in the dynamic directory. In addition, those of ordinary skill within the art will appreciate that a client may request that the server create one or more dynamic attributes for an otherwise static entry in a directory. In this situation as well, what has been described as the client logging onto the server will be recognized as also meaning the client requesting that the server create one or more dynamic attributes in a new static entry for it in the directory. The terminology used in this patent application with respect to a client logging onto a server is also meant to include both of these cases. Furthermore, the message sent by the server to the client in response to a refresh request, after the server has crashed and has been reset, is desirably a dedicated error message instructing the client that it is not logged onto the server, and therefore that it should relog onto the server.

Figure 4A:
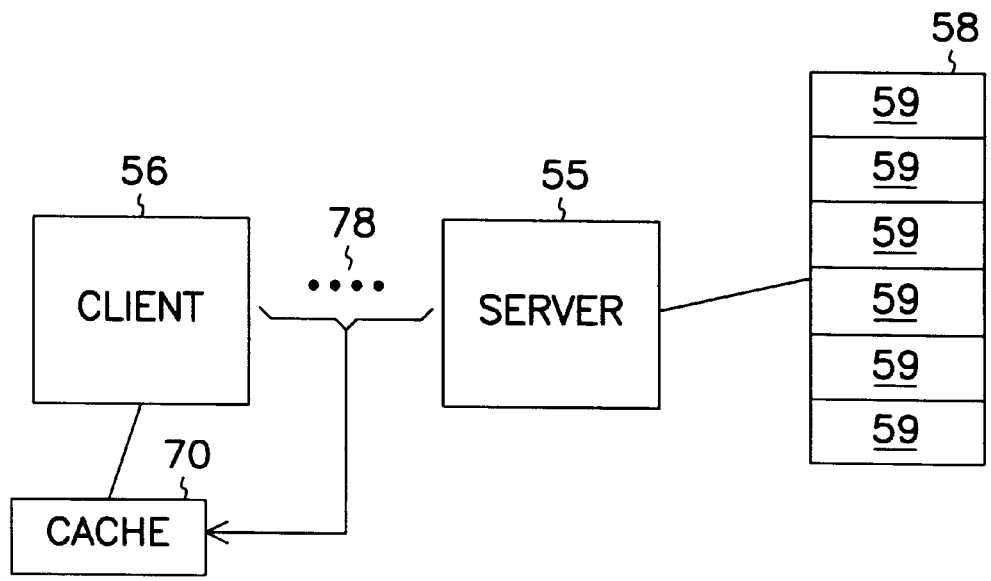
FIGS. 4(a), 4(b), 4(c), 4(d), and 4(e) show diagrams illustrating a system-level overview of an exemplary embodiment of the invention in the case where a network has crashed.

The embodiment of the invention relating to recovery when the server has crashed is also related to recovery when the network has crashed. That is, the same embodiment of the invention provides for automatic relogging of a client onto a server in the case of either the network or the server having had crashed. Referring now to FIG. 4(a), the case of recovery when a network has crashed is described. Client 56 is logging onto server 55 maintaining dynamic directory 58 having slots 59, to initiate an online session with server 55 as has been described. This is represented by series of dots 78. Initiation of an online session is accomplished by a client sending a message to the server requesting that the client be permitted to log onto the server. The information sent by client 56 during log-in with server 55 is saved by client 56 in cache 70.

Figure 4B:
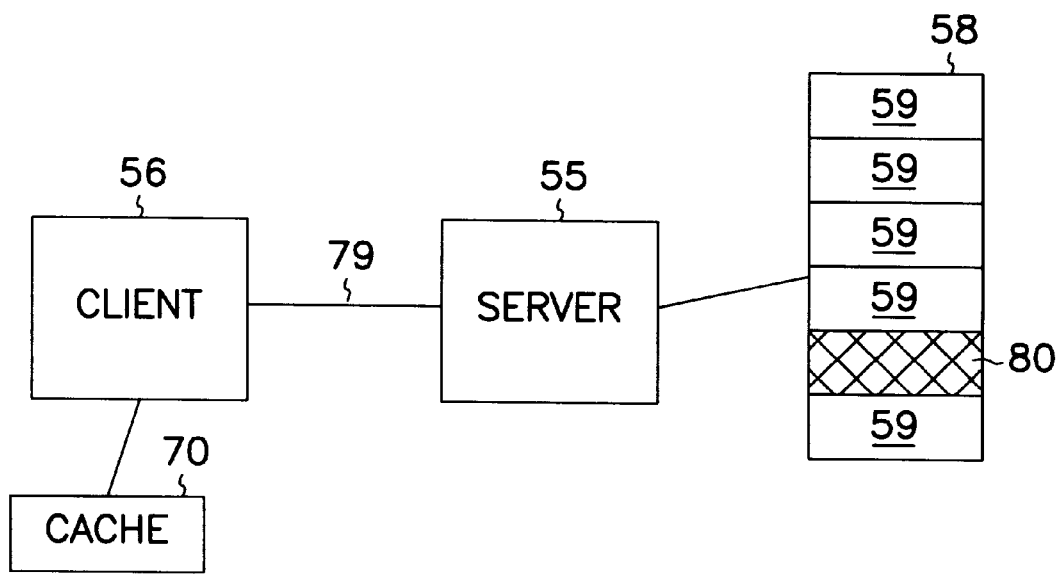

Referring next to FIG. 4(b), client 56 is shown as having successfully logged onto server 55, as represented by solid line 79. Server 55 has filled one of the slots 59 of directory 58 with entry 80 specific to client 56. As has been previously described, the information contained in an entry for a client is not particularly limited by this embodiment of the invention, but desirably includes the user information conveyed by the client when logging on. The information may also include a token as described in conjunction with FIGS. 2(a)–2(d), but the invention is not so limited. The embodiment of the invention relating to recovery when a server or a network has crashed may be implemented independent of the embodiment described in conjunction with FIGs. 2(a)–2(d), which relate to recovery when a client has crashed.

Figure 4C:
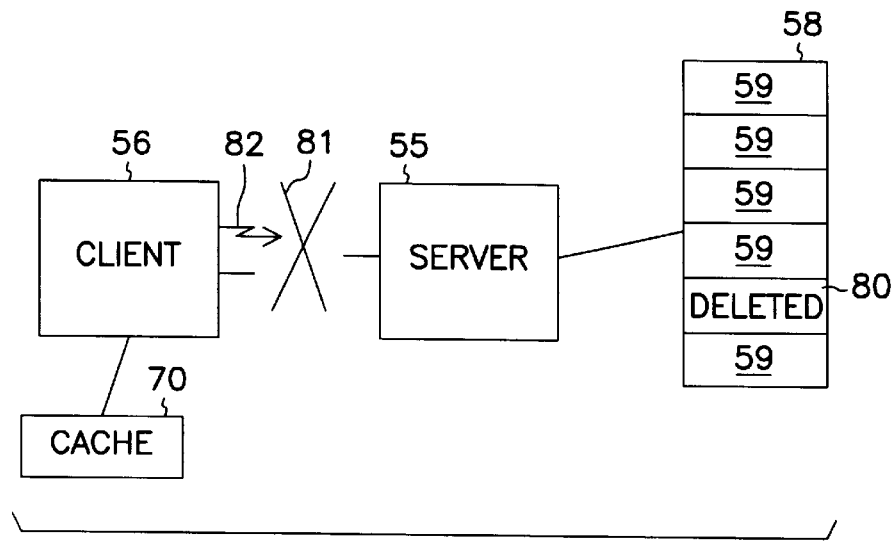

Thus, referring to FIG. 4(c), a network through which client 56 and server 55 are communicatively coupled with one another has crashed, as represented by crossed lines 81. Neither client 56 nor server 55 is aware, however, that the network has crashed. Therefore, client 56 still attempts to send a message to server 55 to refresh its entry 80 within directory 58, as represented by jagged arrow 82. Furthermore, assuming that the network is down for more than a client-refresh period, entry 80 will time out, and will be ultimately deleted by server 55, as is shown in FIG. 4(c).

Figure 4D:
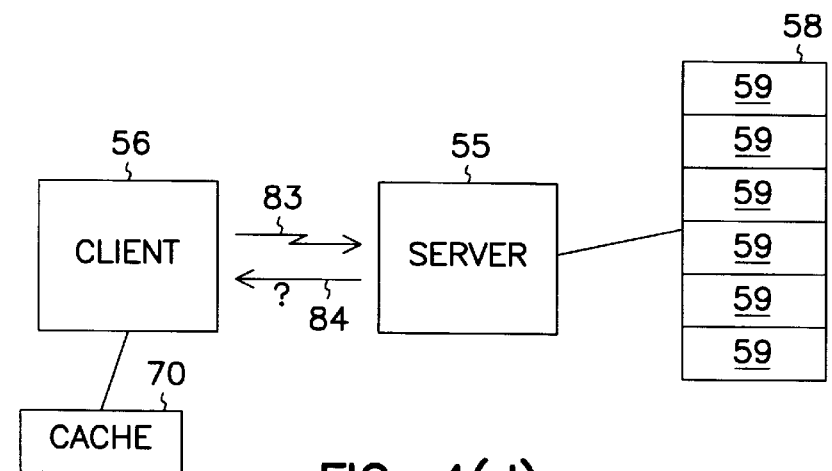

Referring to FIG. 4(d), once the network has come back up such that client 56 may communicate with server 55, a refresh request sent by client 56, as represented by jagged arrow 83, may reach server 55. However, because server 55 had previously deleted the entry to which the refresh request pertains, it will not be able to find the entry, and therefore will send back to client 56 in response an error message. This message is represented by arrow 84. Client 56 will receive this message as a message instructing it to relog onto sever 55, because for a reason not known to client 56, its entry within directory 58 is no longer there.

(Note that in the case where the network has crashed, but was not down for sufficient time for the server to remove the client's entry from the directory, the client may have sent one or more refresh requests that went unanswered by the server because the network was down. However, the client will have ultimately sent a refresh request that was answered by the server after the network came back up, and which the server used to refresh the client's entry as is normally the case.)

Figure 4E:
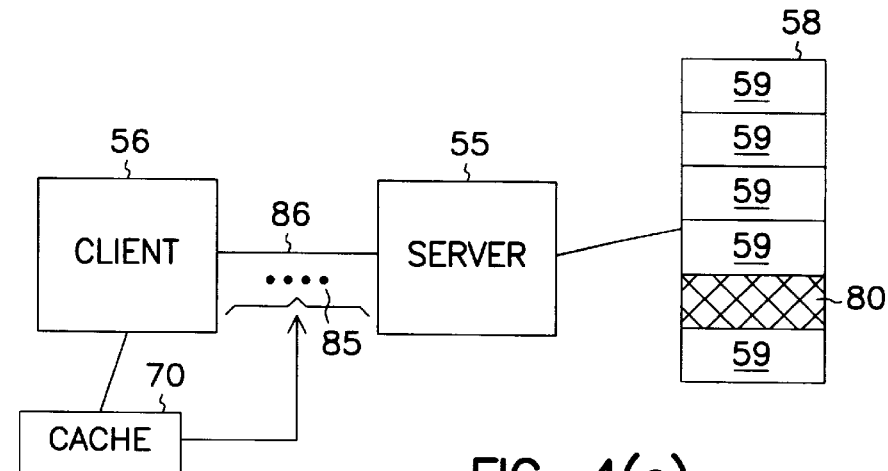

Referring to FIG. 4(e), as described previously in conjunction with FIG. 3(e), client 56 uses the information stored in cache 70 to automatically relog onto server 55 without user intervention. Client 56 sends a message to server 55 requesting that it be permitted to log onto the server, as represented by series of dots 85. The information contained in this message is obtained from cache 70, which contains accurate user information for this client before the server crashes. Server 55 permits client 56 to log onto the server, as represented by solid line 85, and recreates entry 80 within dynamic directory 58, in accordance with information conveyed by client 56 a second time.

The inventive caching of the information used by a client to first log onto a server thus later permits the client to subsequently relog onto the server automatically and without user intervention, such as in the case where the network has crashed, or in the case where the server has crashed. Furthermore, as described in conjunction with FIG. 4(a)–4(e), those of ordinary skill within the art will appreciate that a client may request that the server create more than one entry for it in the dynamic directory. Those of ordinary skill within the art will also appreciate that a client may request that the server create one or more dynamic attributes from an otherwise static entry in a directory. The terminology used in this patent application with respect to a client logging onto a server is also meant to include both of these cases. Furthermore, the message sent by the server to the client in response to a refresh request, after the network has crashed and the client's entry in the dynamic directory maintained by the server has been erased, is desirably a dedicated error message instructing the client that it is not logged onto the server, and therefore that it should relog onto the server.

A system level overview of the invention has been provided. Two embodiments of the invention have been described. In a first embodiment, utilizing an inventive token allows for recovery in the case where a client crashes. In a second embodiment, utilizing an inventive cache allows for recovery in the case where a server or a network crashes. The embodiments may be used with each other, or alone.

Methods of an Exemplary Embodiment for a ULS Implementation

In the previous section, a system level overview of the operation of an exemplary embodiment of the invention was described. In this section, the particular methods performed by the server and the clients of such an exemplary embodiment for a User Location Service (ULS) implementation are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to a flowchart enables one skilled in the art to develop programs including instructions to carry out the methods on a suitable computerized server (the processor of the server executing the instructions from computer-readable media).

As described in the background, the ULS is known within the art. The ULS is a service for Internet users to find other users who are online and retrieve their information. Each user has a client computer. By logging onto the server maintaining the ULS dynamic directory, a user sends his or her information to the server. The ULS server will then have an online session for this user (i.e., an entry in the dynamic directory). Another user also logged onto the server can find information regarding this user, such as the user's IP address. Using the IP address, a call can be placed and an online conference started, for example. Although the embodiment of the invention described in this section is specifically contemplated for ULS, it may also be utilized for any other embodiment of the invention. That is, ULS is not required to practice this embodiment of the invention.

Figure 5A:
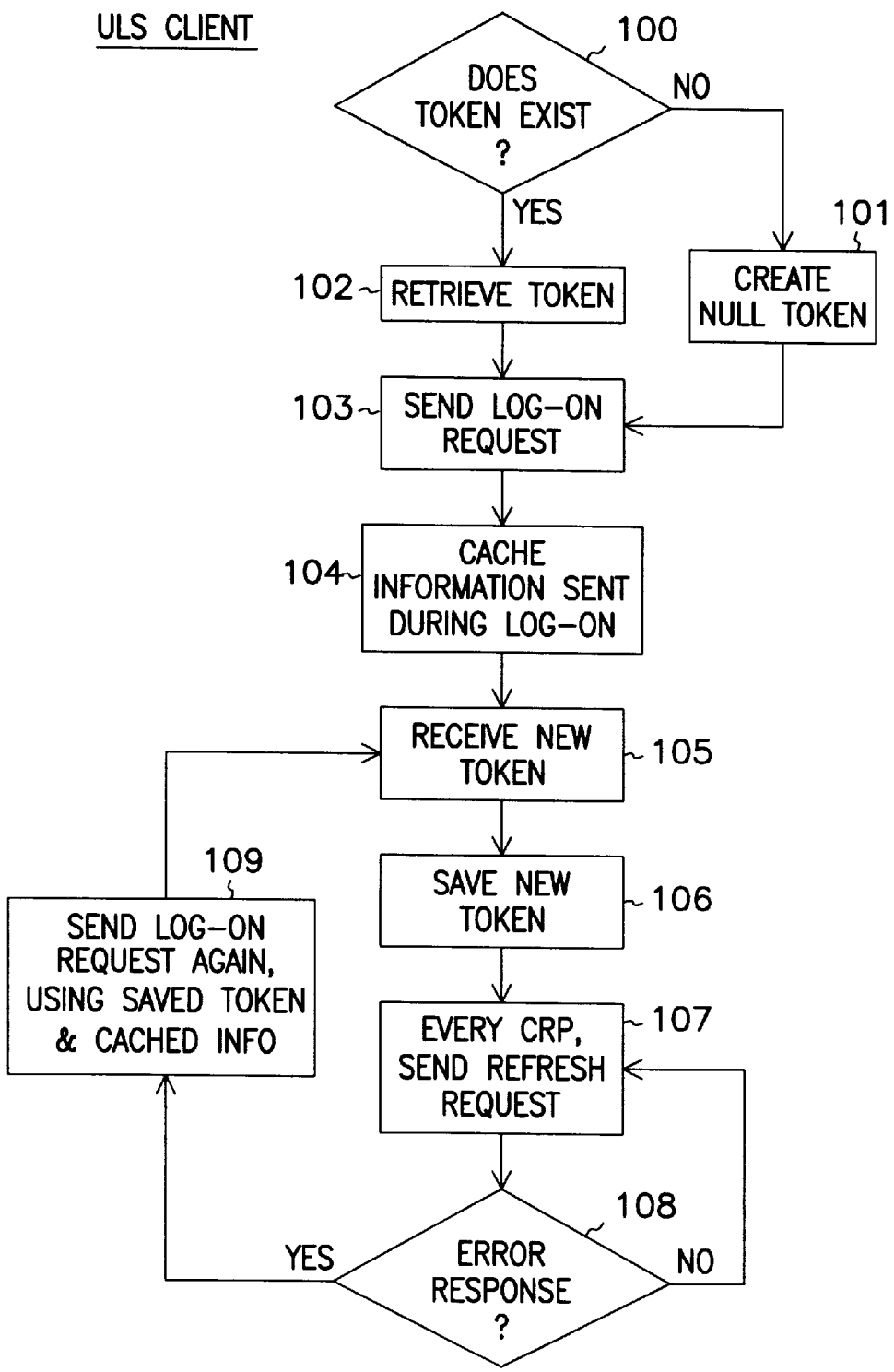
FIG. 5(a) shows a flowchart of a method to be performed by a client according to an exemplary embodiment for a ULS implementation of the invention.

Referring first to FIG. 5(a), a flowchart of a method to be performed by a client according to an exemplary embodiment of the invention is shown. This method is inclusive of the steps or acts required to be taken by the client from logging on to a server maintaining a dynamic directory service to maintaining the resulting online session by sending periodic refresh requests. In step 100, the client determines whether a previously created unique token exists. If a token does not exist, the client creates a null (empty) token in step 101; otherwise, the client retrieves the token in step 102.

In step 103, the client sends a message to the server through a communications device to request that an entry for the client be added in the dynamic directory maintained by the server. The message includes a unique user identification for the client, such as the user's electronic mail address, and also desirably such other user information as the user's first name, last name, city and state, country, and IP address. Besides this user information, the message also includes the unique token created in step 101 or retrieved in step 102. In step 104, the client saves the information sent during the log-on process (i.e., the information in the log-on message) in a cache in a computer-readable medium of the client (such as memory). In step 105, the client receives through the communications device from the server a new token. Therefore, in the ULS implementation, the client receives a new token every time the client starts a new online session with the server. The client saves this token in place of the old token (also to a computer-readable medium) in step 106.

In the exemplary embodiment of FIG. 5(a), the client next sends a refresh request to the server for every client-refresh period (CRP), in step 107. The CRP is desirably set by the server, as known within the art, but may also be set by the client. If in step 108 the client receives a 'no-such-object' response from the server through the communications device (i.e., a ULP_RCODE_CLIENT_NEED_RELOGON response), the method of FIG. 5(a) proceeds back to step 109. This means that the server cannot find the client in the server's dynamic directory. Therefore, the client must relog onto the server. The client relogs onto the server using the token saved in step 106, and using the information cached in step 104. From step 109, the method proceeds to step 105 as is shown in FIG. 5(a); however, the method may also alternatively proceed to step 107, since usually the server does not generate a new token in the case of a token being matched during the relogon process. If in step 108 no error message is received, the method reverts back to step 107, to send another refresh request.

The method of FIG. 5(a) thus combines both the inventive token and inventive cache aspects of the present invention. The client saves a token received from the server in response to logging in step 106. If the client crashes, the method of FIG. 5(a) would start over from step 100. Thus, the client would be permitted to log on again, because the token saved in step 106 would be retrieved in step 102, and resent in step 103. The server would recognize this token, and permit the client to relog on. Furthermore, if the network or the server crashes, the client would receive an error message in 108, such that it would relog on automatically and without user intervention in step 109 using the information previously cached in step 104.

Figure 5B:
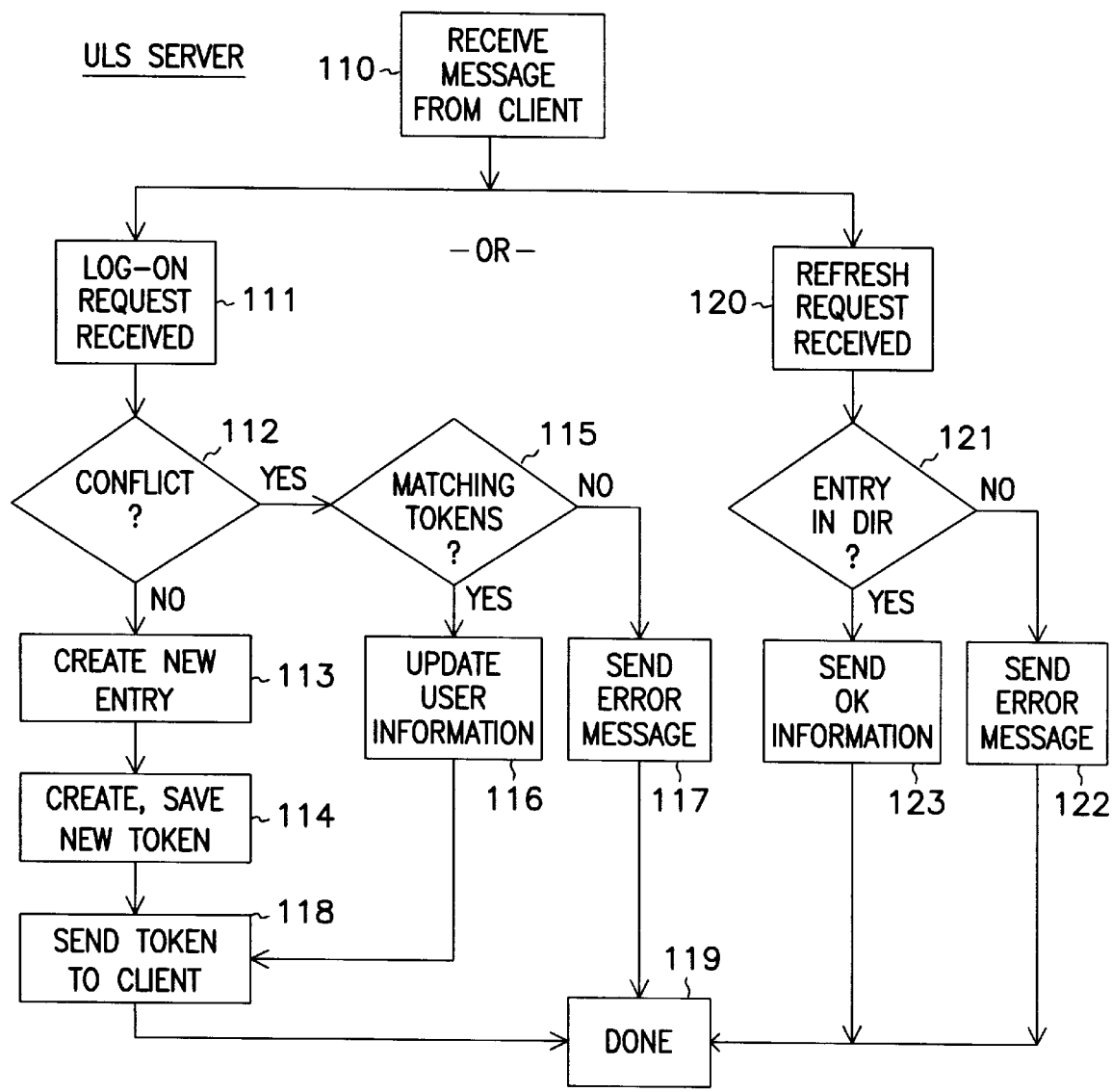
FIG. 5(b) shows a flowchart of a method to be performed by a server according to an exemplary embodiment for a ULS implementation of the invention.

Referring next to FIG. 5(*b*), a flowchart of an event-driven method to be performed by a ULS server according to an exemplary embodiment of the invention is shown. This method is event driven in that it is not performed by the server unless and until it receives a message from the client through a communications device of the server. From the starting point of step 110, the server receives a message including a request from a client through its communication device. This request may be one of at least two types: a request to add an entry for the client to a dynamic directory maintained by the server (i.e., log onto the server), or a request to refresh the entry for the client within the dynamic directory.

If the request is to log onto the server, the method of FIG. 5(*b*) proceeds from step 110 to step 111 to step 112, at which step the server determines if there is already an entry in the dynamic directory having the same unique identifier (e.g., e-mail address) as that submitted in the log-on request. If there is not a conflict, an entry for the client is created by the server in the dynamic directory in step 113. This entry is an online session for the user of the client. An online session is represented as an entry in the directory database that desirably resides in memory to permit frequent access and updating of the database. An entry is composed of user identification including e-mail name, first name, last name, city and state, country, and IP address, as has been described. The entire database, because it resides desirably in memory, may be lost if the server terminates or crashes. From step 113, the method proceeds to step 114, in which step the server next creates and saves (in a computer-readable media of the server, such as memory) a new token for the client sending the log-on request.

If in step 112 the server determines that there is another entry in the dynamic entry having the same unique identifier as that submitted in the log-on request, the server next determines in step 115 if the token for the client of this dynamic entry as previously saved by the server matches the token also submitted in the log-on request. If the tokens match, this means that this client is attempting to relog onto the server, perhaps after having had crashed. Therefore, the server permits the client to relog onto the server, and updates the user information in the dynamic entry in step 116. Otherwise, the server does not allow the log-on request to proceed, and instead sends an error message in step 117. Upon creating and saving a new token for the client in step 114, or upon updating user information in an already existing directory entry in step 116, the server proceeds in step 118 to send a response to the user including the token (either the token created and saved in step 114, or the token previously in the entry, from step 115). The method of FIG. 5(*b*) then ends in step 119 from either step 117 or step 118.

However, if the request is to refresh the entry for a client that has already been created in the dynamic directory, the method of FIG. 5(*a*) proceeds from step 110 to step 120, and then to step 121. In step 121, the server determines whether the entry for the client is indeed in the dynamic directory. This is necessary because an intermediate problem (such as a crash) between the time when the client had sent the request to the server to add an entry to the directory and the time when the client sent the request to refresh the entry may have caused the server to reset or reboot such that the dynamic directory has been erased. Thus, if the entry cannot be found in step 121, the method proceeds to step 122 so that the server sends an error message (i.e., a message including the error code ULP_RCODE_CLIENT_NEED_RELOGON) to the client through the server's communication device. Conversely, if the entry is found in step 121, the method proceeds to step 123 to send a message to the client through the communication device that includes a response to the refresh request that the entry has been refreshed. In addition, the response also desirably includes a value to which the client should set its CRP. The method ends at step 119.

The method of FIG. 5(*b*) also thus combines both the inventive token and inventive cache aspects of the present invention. The server creates and saves a new token for the client in step 114. If it receives a log-on request having duplicate user information, the server allows the client sending the request to take over an already existing database entry if the token submitted in the request matches the token that the server has on record for the client that created the entry. Thus, if a client crashes and must relog onto the server, the client would be permitted to so log on again. Furthermore, if the network or the server crashes, and the dynamic directory is erased, any client sending a refresh request for an entry previously in the directory would instead receive an error message in step 122, such that it has to relog onto the server.

The particular methods performed by the server and the clients of an exemplary embodiment for an ULS implementation of the invention have been described. The method performed by a client has been shown by reference to a flowchart including all the steps from logging on to a server maintaining a dynamic directory service to maintaining the resulting online session by sending periodic refresh requests. The method performed by the server has been shown by reference to a flowchart of a method driven by the event of the server receiving a message from a client.

Methods of an Exemplary Embodiment for an ILS Implementation

In this section, the particular methods performed by the server and the clients of an exemplary embodiment for an Internet Locator Service (ILS) implementation are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processors of the clients executing the instructions from computer-readable media). Similarly, the methods to be performed by the server constitute computer programs also made up of computer-executable instructions. Describing the methods by reference to a flowchart enables one skilled in the art to develop programs including instructions to carry out the methods on a suitable computerized server (the processor of the clients executing the instructions from computer-readable media).

The ILS is known within the art. The ILS is like the ULS in that it is a service for Internet users to find other users who are online and retrieve their information. The ILS, however, is based on the extension to the Lightweight Directory Access Protocol (LDAP), as known within the art and described in the background section. The ILS also supports the User Location Protocol (ULP) of the ULS, also known within the art, and thus can be viewed as a superset of ULS. Those of ordinary skill within the art will recognize, though, that the primary protocol utilized by the ILS is LDAP.

Each ILS client (i.e., user) has a client computer. By logging onto the server maintaining the ILS dynamic directory, a user sends his or her information to the server. The ILS server will then have an online session for this user (i.e., an entry in the dynamic directory). Another user also logged onto the server can find information regarding this user, such as the user'IP address. Furthermore, although the embodiment of the invention described in this section is specifically contemplated for ILS, it may also be utilized for any other embodiment of the invention. That is, ILS is not required to practice this embodiment of the invention.

The primary difference between the ILS and the ULS implementations of the invention is that, as will be described, the client creates the token in the ILS implementation, while the server creates the token in the ULS implementation. Creation of the token at the server is desirable because the server is able to determine authoritatively if the created token is unique. However, in the LDAP supported by the ILS, there is no manner by which to send a token in response to a log-on request from a client. Therefore, the client must create the token. Note also that in the ILS implementation the client only creates a token once, while in the ULS implementation a token is created for a particular client each time the client begins a new online session.

Figure 6A:
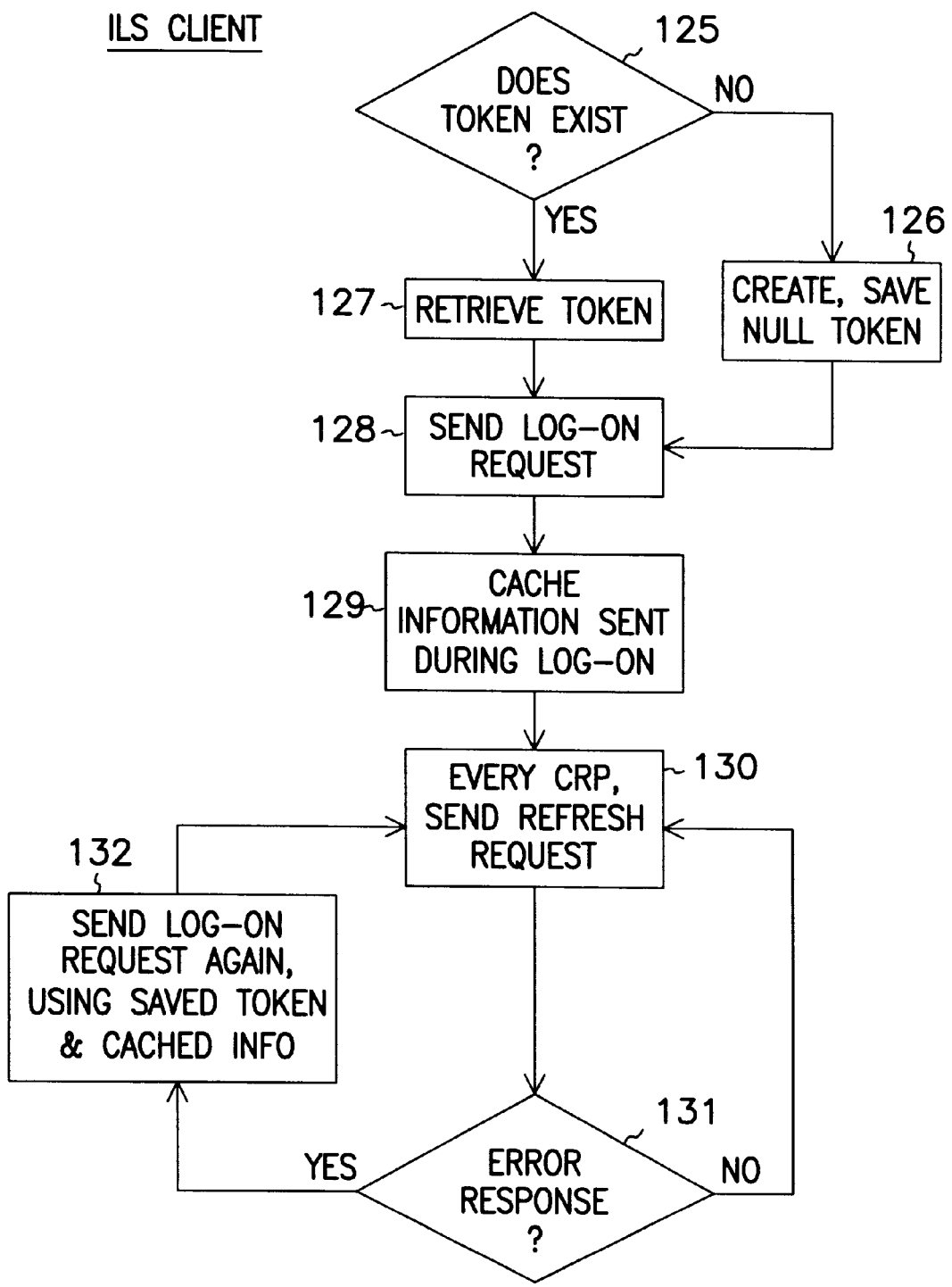
FIG. 6(a) shows a flowchart of a method to be performed by a client according to an exemplary embodiment for an ILS implementation of the invention.

Referring first to FIG. 6(a), a flowchart of a method to be performed by a client according to an exemplary embodiment of the invention is shown. This method is inclusive of the steps or acts required to be taken by the client from logging on to a server maintaining a dynamic directory service to maintaining the resulting online session by sending periodic refresh requests. In step 125, the client determines whether a previously created unique token exists. If a token does not exist, the client creates a new token in step 126, and saves the token to a computer-readable medium such as memory; otherwise, the client retrieves the token previously created in step 127.

In step 128, the client sends a message to the server through a communications device to request that an entry for the client be added in the dynamic directory maintained by the server. The message includes a unique user identification for the client, such as the user's electronic mail address, and also desirably such other user information as the user's first name, last name, city and state, country, comment and IP address. Such user identification information (including the e-mail address) is known as the standard ILS attributes. Besides this user information, the message also includes the unique token created in step 126 or retrieved in step 127. In step 129, the client saves the information sent during the log-on process (i.e., the information in the log-on message) in a cache in a computer-readable medium of the client (such as memory).

In the exemplary embodiment of FIG. 6(a), the client next sends a refresh request to the server for every client-refresh period (CRP), in step 130. The CRP is desirably set by the server, as known within the art, but may also be set by the client. If in step 131 the client receives a 'no-such-object' response from the server through the communications device (i.e., a LDAP_NO_SUCH_OBJECT response), the method of FIG. 6(a) proceeds to step 132. This means that the server cannot find the client in the server's dynamic directory. Therefore, the client must relog onto the server. The client relogs onto the server using the token previously created or retrieved, and using the information cached in step 129. If in step 131 no error message is received, the method reverts back to step 130, to send another refresh request.

The method of FIG. 6(a) thus combines both the inventive token and inventive cache aspects of the present invention. The client creates a token in step 126, which is then saved. If the client crashes, the method of FIG. 6(a) would start over from step 125. Thus, the client would be permitted to log on again, because the token saved in step 126 would be retrieved in step 127, and resent in step 128. The server would recognize this token, and permit the client to relog on. Furthermore, if the network or the server crashes, the client would receive an error message in 131, such that it would relog on automatically and without user intervention in step 132 using the information previously cached in step 129.

Figure 6B:
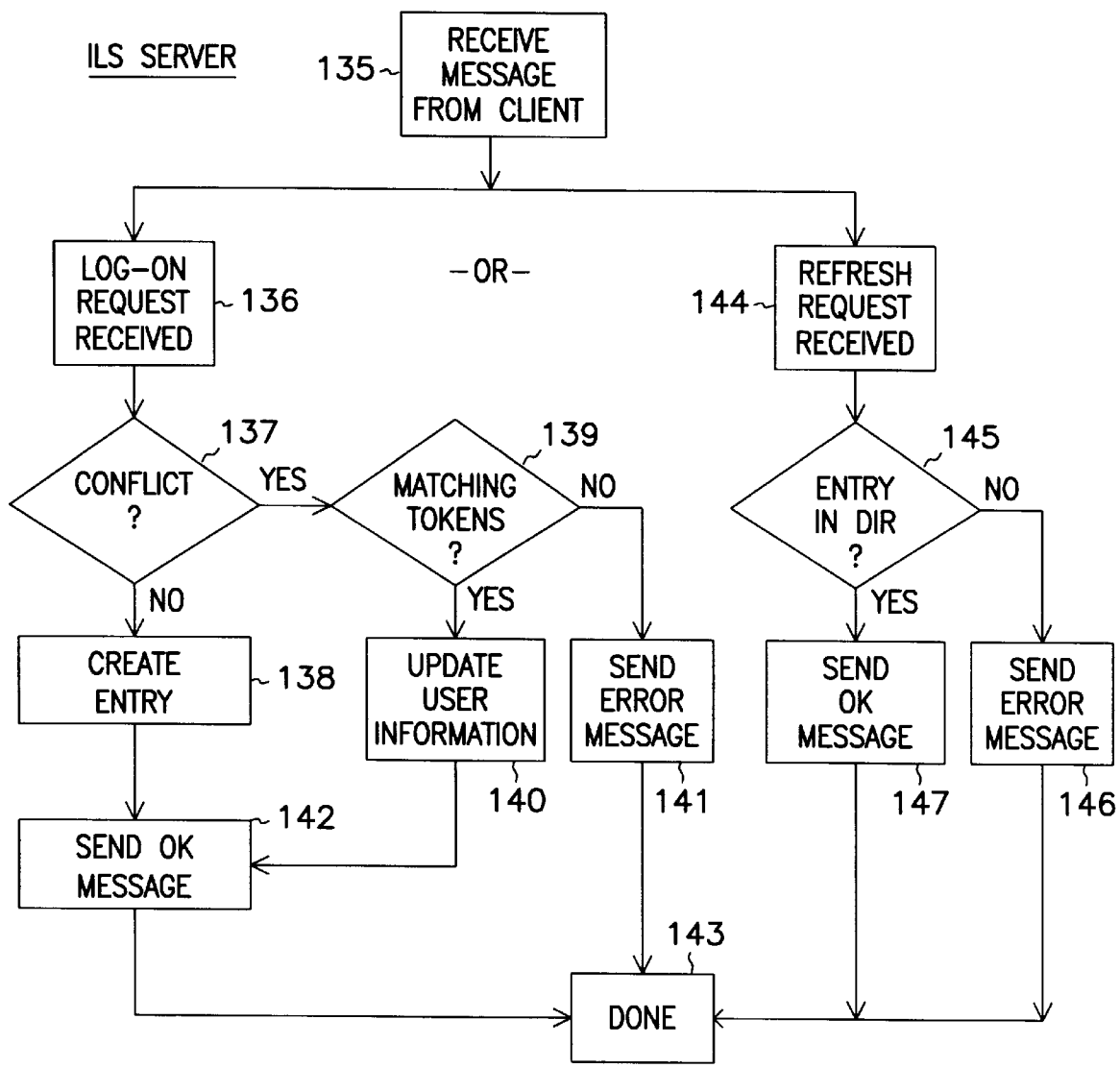
FIG. 6(b) shows a flowchart of a method to be performed by a server according to an exemplary embodiment for an ILS implementation of the invention.

Referring next to FIG. 6(b), a flowchart of an event-driven method to be performed by an ILS server according to an exemplary embodiment of the invention is shown. This method is event driven in that it is not performed by the server unless and until it receives a message from the client through a communications device of the server. From the starting point of step 135, the server receives a message including a request from a client through its communication device. This request may be one of at least two types: a request to add an entry for the client to a dynamic directory maintained by the server (i.e., log onto the server), or a request to refresh the entry for the client within the dynamic directory.

If the request is to log onto the server, the method of FIG. 6(b) proceeds from step 136 to step 137, at which step the server determines if there is already an entry in the dynamic directory having the same unique identifier (e.g., e-mail address) as that submitted in the log-on request. If there is not a conflict, an entry for the client is created by the server in the dynamic directory in step 138. This entry is an online session for the user of the client. An online session is represented as an entry in the directory database that desirably resides in memory to permit frequent access and updating of the database. An entry is composed of user identification standard attributes including e-mail name, first name, last name, city and state, country, and IP address, as has been described. The entry may also be composed of extended attributes, such as the ability to join an audio conference, the ability to join a video conference, status of being a conference, etc. The functionality of an ILS server is thus richer than a ULS server. The entire database, because it resides desirably in memory, may be lost if the server terminates or crashes.

If in step 137 the server determines that there is another entry in the dynamic entry having the same unique identifier as that submitted in the log-on request, the server next determines in step 139 if the token for the client of this dynamic entry as previously saved by the server matches the token also submitted in the log-on request. If the tokens match, this means that this client is attempting to relog onto the server, perhaps after having had crashed. Therefore, the server permits the client to relog onto the server, and updates the user information in the dynamic entry in step 140. Otherwise, the server does not allow the log-on request to proceed, and instead sends an error message in step 141. Upon creating a directory entry for the client in step 138, or upon updating user information in an already existing directory entry in step 140, the server proceeds in step 142 to send a response to the user that the log-on was successful. The method of FIG. 6(b) then ends in step 143 from either step 141 or step 142.

However, if the request is to refresh the entry for a client that has already been created in the dynamic directory, the method of FIG. 6(b) proceeds from step 135 to step 144, and then to step 145. In step 145, the server determines whether the entry for the client is indeed in the dynamic directory. This is necessary because an intermediate problem (such as a crash) between the time when the client had sent the request to the server to add an entry to the directory and the time when the client sent the a request to refresh the entry may have caused the server to reset or reboot such that the dynamic directory has been erased. Thus, if the entry cannot be found in step 145, the method proceeds to step 146 so that the server sends an error message (i.e., a message including the error code LDAP_NO_SUCH_OBJECT) to the client through the server's communication device. Conversely, if the entry is found in step 145, the method proceeds to step 147 to send a message to the client through the communication device that includes a response to the refresh request that the entry has been refreshed. In addition, the response also desirably includes a value to which the client should set its CRP. The method ends at step 143.

The method of FIG. 6(*b*) also thus combines both the inventive token and inventive cache aspects of the present invention. If the server receives a log-on request having duplicate user information, the server allows the client sending the request to take over an already existing database entry if the token submitted in the request matches the token that the server has on record for the client that created the entry. Thus, if a client crashes and must relog onto the server, the client would be permitted to so log on again. Furthermore, if the network or the server crashes, and the dynamic directory is erased, any client sending a refresh request for an entry previously in the directory would instead receive an error message in step 146, such that it has to relog onto the server.

The particular methods performed by the server and the clients of an exemplary embodiment for an ILS implementation of the invention have been described. The method performed by a client has been shown by reference to a flowchart including all the steps from logging on to a server maintaining a dynamic directory service to maintaining the resulting online session by sending periodic refresh requests. The method performed by the server has been shown by reference to a flowchart of a method driven by the event of the server receiving a message from a client.

Methods of an Exemplary Embodiment for a ULS/ILS Implementation

In this section, the particular methods performed by the server and the clients of an exemplary embodiment for a unified User Location Service (ULS)/Internet Locator Service (ILS) implementation are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to a flowchart enables one skilled in the art to develop programs including instructions to carry out the methods on a suitable computerized server (the processor of the clients executing the instructions from computer-readable media).

The unified ULS/ILS implementation solves the client-crashing, network-crashing, and serving-crashing problems, for either ULS or ILS. The unified implementation is similar to the ULS implementation. The primary difference between the unified and the ULS implementations of the invention is that, as will be described, the server in the unified implementation provides the client with the token the server has created in response to a refresh request from the client, which is possible to implement in both the ULS-supported ULP, or the ILS-supported LDAP. As part of the log-on process, the client sends a refresh request immediately after logging on, to obtain this token.

Figure 7A:
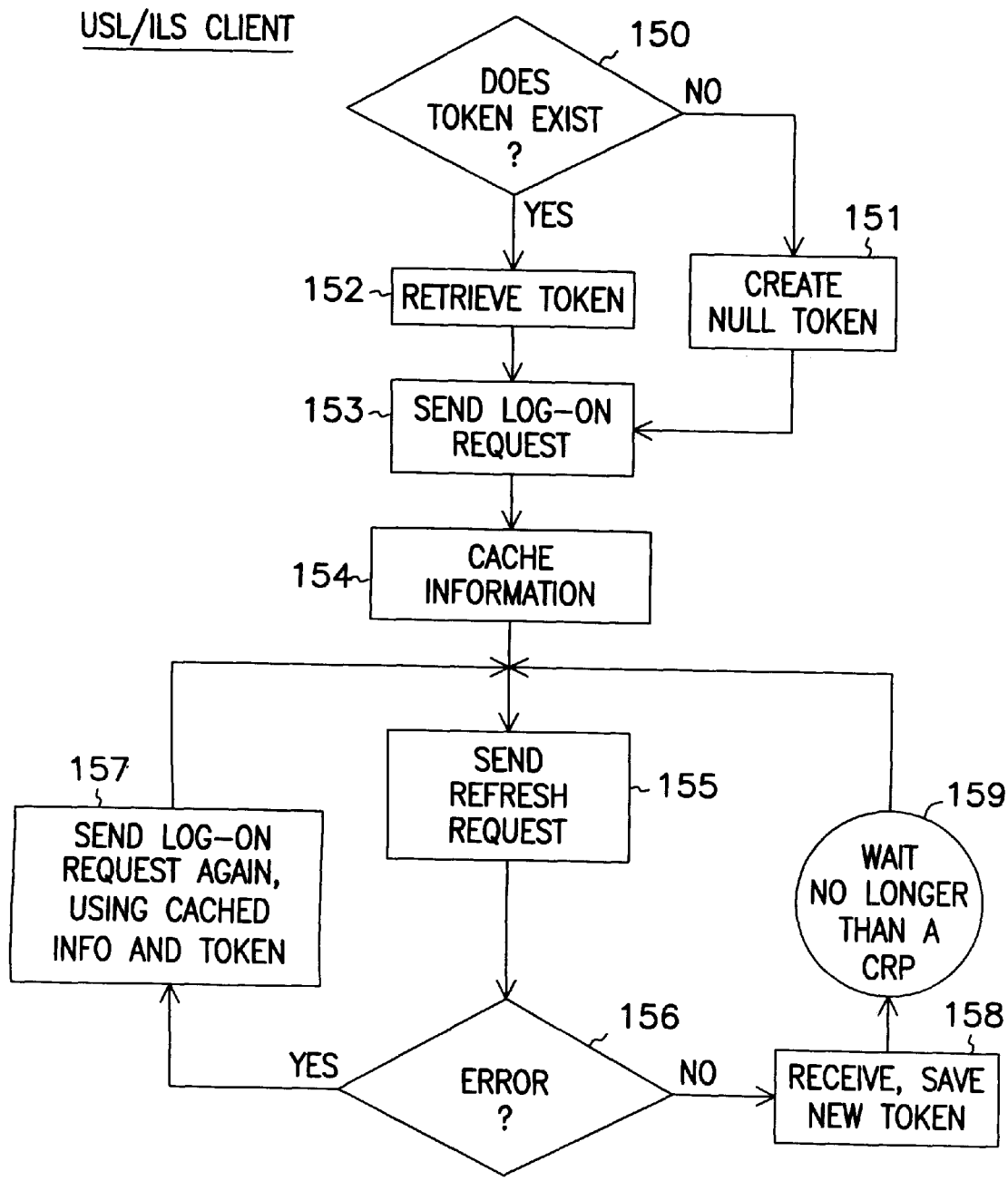
FIG. 7(a) shows a flowchart of a method to be performed by a client according to an exemplary embodiment for either an ILS or ULS implementation of the invention; and, FIG. 7(b) shows a flowchart of a method to be performed by a server according to an exemplary embodiment for either an ILS or ULS implementation of the invention.
Figure 7B:
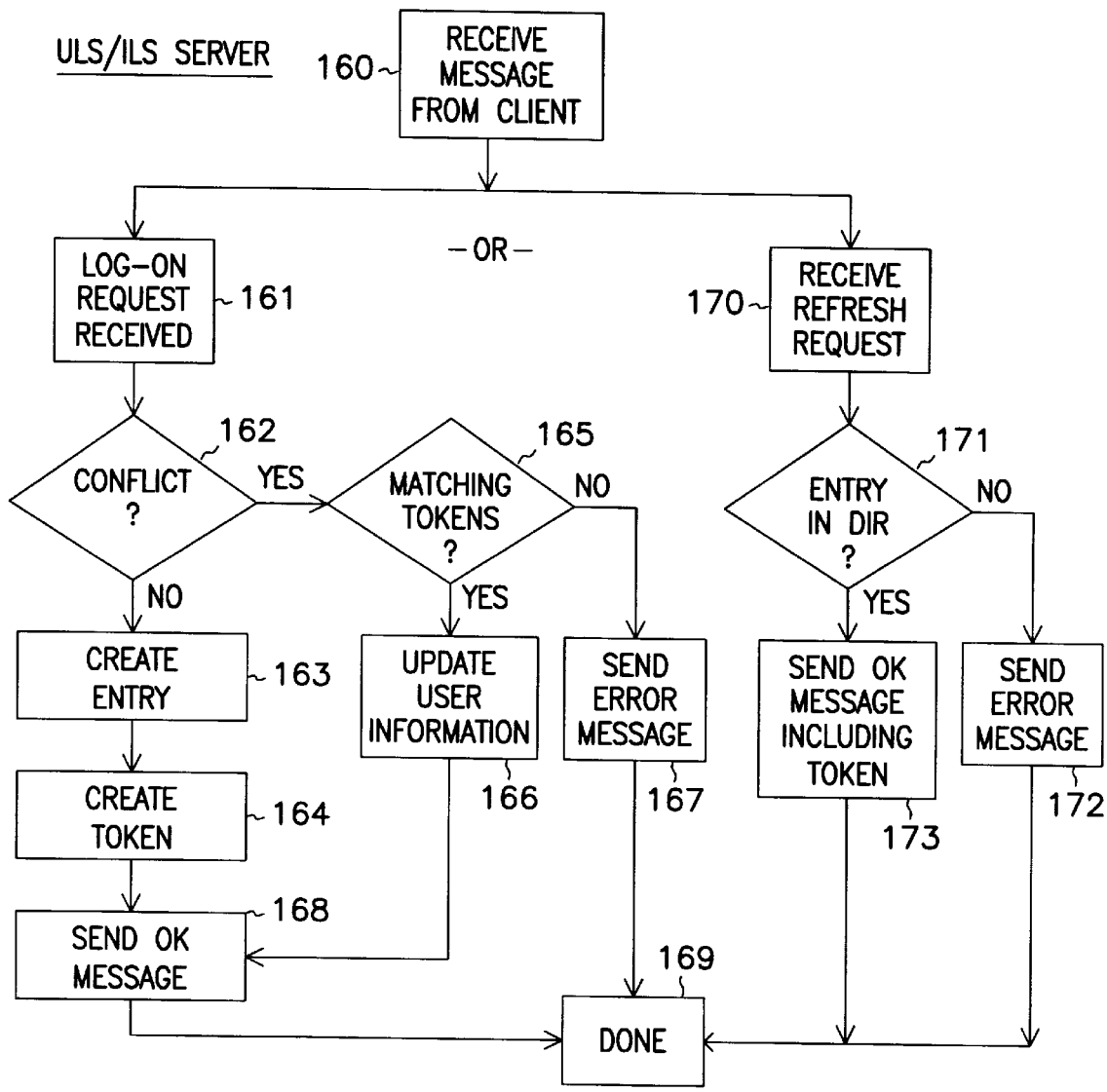

Referring first to FIG. 7(*a*), a flowchart of a method to be performed by a client according to an exemplary embodiment of the invention is shown. This method is inclusive of the steps or acts required to be taken by the client from logging on to a server maintaining a dynamic directory service to maintaining the resulting online session by sending periodic refresh requests. In step 150, the client determines whether a previously created unique token exists. If a token does not exist, the client creates a null (empty) token in step 151, and saves the token to a computer-readable medium such as memory; otherwise, the client retrieves the token previously created in step 152.

In step 153, the client sends a message to the server through a communications device to request that an entry for the client be added in the dynamic directory maintained by the server. The message includes a unique user identification for the client, such as the user's electronic mail address, and also desirably such other user information as the user's first name, last name, city and state, country, comment and IP address. Besides this user information, the message also includes the unique token created in step 151 or retrieved in step 152. In step 154, the client saves the information sent during the log-on process (i.e., the information in the log-on message) in a cache in a computer-readable medium of the client (such as memory).

In the exemplary embodiment of FIG. 7(*a*), the client next sends a refresh request immediately in step 155. If in step 156 the client receives an error response from the server through the communications device, the method of FIG. 7(*a*) proceeds to step 157. This means that the server cannot find the client in the server's dynamic directory. Therefore, the client must relog onto the server. The client relogs onto the server using the token previously created or retrieved, and using the information cached in step 154. If in step 156 no error message is received, the method proceeds to step 158, in which it receives a new token from the server, and saves this token to a computer-readable medium such as memory. The client may also receive a server-dictated client-refresh period. In step 159, the client waits no longer than the CRP before proceeding back to step 155, to send another refresh request.

Referring next to FIG. 7(*b*), a flowchart of an event-driven method to be performed by an ILS server according to an exemplary embodiment of the invention is shown. This method is event driven in that it is not performed by the server unless and until it receives a message from the client through a communications device of the server. From the starting point of step 160, the server receives a message including a request from a client through its communication device. This request may be one of at least two types: a request to add an entry for the client to a dynamic directory maintained by the server (i.e., log onto the server), or a request to refresh the entry for the client within the dynamic directory.

If the request is to log onto the server, the method of FIG. 7(*b*) proceeds from step 160 to step 161 to step 162, and the server determines if there is already an entry in the directory having the same unique identifier as that submitted in the log-on request. If there is not a conflict, an entry for the client is created in the directory in step 163, and a token is created in step 164. If in step 162 the server determines that there is another entry having the same unique identifier as that submitted in the log-on request, the server determines in step 165 if the token for the client of this dynamic entry as previously saved by the server matches the token also submitted in the log-on request. If the tokens match, the server permits the client to relog onto the server, and updates the user information in the entry in step 166. Otherwise, the server sends an error message in step 167. Upon creating a token in step 164, or upon updating user information in step 166, the server proceeds in step 168 to send a response to the user that the log-on was successful. The method of FIG. 7(*b*) then ends in step 169.

However, if the request is to refresh the entry for a client that has already been created in the dynamic directory, the method of FIG. 7(*b*) proceeds from step 160 to step 170, and then to step 171. In step 171, the server determines whether the entry for the client is indeed in the dynamic directory. If the entry cannot be found in step 171, the method proceeds to step 172 so that the server sends an error message to the client through the server's communication device. Conversely, if the entry is found in step 171, the method proceeds to step 173 to send a message to the client through the communication device that includes a response including the token created for the client. The response may also desirably include a value to which the client should set its CRP. The method ends at step 169.

The particular methods performed by the server and the clients of an exemplary embodiment for a unified ULS/ILS implementation of the invention have been described. The method performed by a client has been shown by reference to a flowchart including all the steps from logging on to a server maintaining a dynamic directory service to maintaining the resulting online session by sending periodic refresh requests. The method performed by the server has been shown by reference to a flowchart of a method driven by the event of the server receiving a message from a client.

Conclusion

The recovery of online sessions for directory services has been described. In particular the use of an inventive token for the recovery of an online session when a client has crashed, and the use of an inventive cache for the automatic recovery of an online session when a network or a server has crashed, have been described. For example, the message sent by the server to the client in response to a refresh request, after the client's entry in the directory no longer exists after a server or network crash, may be a dedicated error message instructing the client that it is not logged onto the server, and therefore that it should relog onto the server. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized system comprising:

a plurality of clients, each client having a unique token;

a server to which each of the plurality of clients is logged on, the server aware of the unique token for each client;

a dynamic directory service executing on the server and maintaining an entry for each client logged on;

wherein each client is able to use its unique token to be permitted by the server to relog onto the server.

2. The computerized system of claim 1, wherein a client relogs onto the server upon the client crashing using the same entry in the dynamic directory service.

3. The computerized system of claim 1, wherein the unique token for each client is created by the client.

4. The computerized system of claim 1, wherein the unique token for each client is created by the server.

5. A computerized client logged onto a computerized server comprising:

a processor;

a computer-readable medium operatively coupled to the processor, and storing data representing a unique token for the client;

a dynamic directory service;

a communications device operatively coupled to the processor; and, instructions executed by the processor from the computer-readable medium to cause the client to, upon the client crashing, relog onto the server through the communications device using the unique token.

6. A computerized server to which a plurality of clients are logged on comprising:

a processor;

a computer-readable medium operatively coupled to the processor, and storing data representing a unique token for each client in a dynamic directory service;

a communications device operatively coupled to the processor; and, instructions executed by the processor from the computer-readable medium to cause the server to receive through the communications device a token of a previous online session from a client attempting to relog on to the server; and, determining whether to permit the client to relog onto the server by matching the token of the previous online session with the unique token.

7. The computerized server of claim 6, wherein the instructions further cause the server to generate a new token and send through the communications device the new token to the client.

8. A computerized method for a client previously logged onto a dynamic directory service on a server to relog onto the server, comprising:

sending from the client to the server a log-on request including a token previously saved by the client;

determining at the server whether the token of the log-on request matches a token for a previous online session of the client previously saved by the server in the dynamic directory service; and, permitting the client to relog onto the server upon determining at the server that the token of the log-on request matches the token for the previous online session of the client.

9. The computerized method of claim 8, further comprising generating and saving at the server a new token.

10. The computerized method of claim 9, further comprising:

sending from the server to the client a response to the log-on request including the new token; and, saving at the client the new token.

11. The computerized method of claim 9, further comprising:

sending from the client to the server a refresh request;

sending from the server to the client a response to the refresh request including the new token; and, saving at the client the new token.

12. The computerized method of claim 8, further comprising generating and saving at the client the token before sending from the client to the server the log-on request including the token previously saved by the client.

13. A computer-readable medium comprising executable instructions to cause a suitably equipped client computer to perform a method comprising:

sending to a server a log-on request including a token previously saved by the client which corresponds to a token saved in a dynamic directory service on the server;

receiving a response to the log-on request including a new token; and, saving the new token.

14. A computer-readable medium comprising executable instructions to cause a suitably equipped client computer to perform a method comprising:

sending to a server a log-on request including a token previously saved by the client which corresponds to a token saved in a dynamic directory service on the server;

sending to the server a refresh request;

receiving a response to the refresh request including a new token; and, saving the new token.

15. A computer-readable medium comprising executable instructions to cause a suitably equipped client computer to perform a method comprising:

generating a token;

saving the token;

sending to a server a first log-on request including the token which is saved in a dynamic directory service on the server;

sending to the server a refresh request;

receiving from the server a request to log onto the server; and, sending to the server a second log-on request including the token.

16. A computer-readable medium comprising executable instructions to cause a suitably equipped server computer to perform a method comprising:

receiving from a client a log-on request including a token;

determining whether the token of the log-on request matches a token for a previous online session of the client previously saved by the server; and permitting the client to log onto the server upon determining that the token of the log-on request matches the token for the previous online session of the client corresponding to an entry in a dynamic directory service.

17. The computer-readable medium of claim 16, the method further comprising:

generating and saving a new token; and, sending to the client a response to the log-on request including the new token.

18. The computer-readable medium of claim 16, the method further comprising:

generating and saving a new token;

receiving a refresh request from the client; and, sending to the client a response to the refresh request including the new token.

19. A method of reconnecting a client to a server, the method comprising:

maintaining an entry in a dynamic directory service describing a connection between the client and the server;

receiving a request to reconnect to the server using the same entry, such request identifying a unique token corresponding to the connection between the client and the server; and updating the entry to reconnect the client and the server using the same entry provided that the unique token was the correct token.

20. A computer readable medium having instructions stored thereon for causing a computer to perform the method of claim 19.

\* \* \* \* \*

UNITED STATES PATENT AND TRADEMARK OFFICE
CERTIFICATE OF CORRECTION

PATENT NO. : 6,006,331
DATED : December 21, 1999
INVENTOR(S) : Chu et al.

It is certified that error appears in the above-identified patent and that said Letters Patent is hereby corrected as shown below:

Title page,
Item [56], OTHER PUBLICATIONS, "Mikronetm" should read -- Mikronet --.

Column 2,
Line 37, "entry-will" should read -- entry will --.

Column 17,
Line 5, "user'IP" should read -- user's IP --.

Signed and Sealed this

Thirteenth Day of January, 2004

JON W. DUDAS
*Acting Director of the United States Patent and Trademark Office*